US006512886B2

(12) United States Patent
DiRisio

(10) Patent No.: US 6,512,886 B2
(45) Date of Patent: Jan. 28, 2003

(54) CAMERA WITH SELF-TIMER FOR DELAYED ACTION SHUTTER RELEASE

(75) Inventor: Anthony DiRisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/867,838

(22) Filed: May 30, 2001

(65) Prior Publication Data

US 2002/0191971 A1 Dec. 19, 2002

(51) Int. Cl.$^7$ .............................................. G03B 17/02
(52) U.S. Cl. ......................................... 396/6; 396/472
(58) Field of Search ............................ 396/6, 264, 502, 396/455, 472, 473, 476, 543

(56) References Cited

U.S. PATENT DOCUMENTS

| 236,916 | A | | 1/1881 | Suder ........................... 396/502 |
| 1,263,018 | A | | 4/1918 | Barbee ......................... 396/503 |
| 2,981,168 | A | | 4/1961 | Biedermann et al. ........ 396/455 |
| 3,852,785 | A | * | 12/1974 | Ogihara et al. .............. 396/452 |
| 3,950,773 | A | | 4/1976 | Winkler et al. .............. 396/502 |
| 4,293,210 | A | | 10/1981 | Kando et al. ................. 396/502 |
| 4,313,662 | A | * | 2/1982 | Kurei et al. .................. 396/472 |
| 4,329,039 | A | | 5/1982 | Kaneko ......................... 396/502 |
| 5,317,353 | A | * | 5/1994 | Kobayashi et al. .......... 396/472 |
| 5,915,134 | A | * | 6/1999 | Arai et al. .................... 396/543 |
| 5,946,514 | A | | 8/1999 | Balling ......................... 396/472 |

* cited by examiner

*Primary Examiner*—D Rutledge
(74) *Attorney, Agent, or Firm*—Roger A. Fields

(57) ABSTRACT

A camera comprising a shutter release button that is manually depressible to initiate picture-taking, and a self-timer for automatically initiating picture-taking after a predetermined interval of time has elapsed, is characterized in that a restrainer is movable to prevent picture-taking from being initiated due to the shutter release button being manually depressed and is retractable following the shutter release button being manually depressed to permit picture-taking to proceed, and the self-timer is a flexible resilient diaphragm that can be manually deformed from a relaxed state to a tensioned state to move the restrainer to prevent picture-taking from being initiated and that will automatically recover to the relaxed state from the tensioned state after the predetermined interval of time has elapsed to allow the restrainer to permit picture-taking to proceed.

9 Claims, 7 Drawing Sheets

CAMERA WITH SELF-TIMER FOR DELAYED ACTION SHUTTER RELEASE

CROSS-REFERENCE TO RELATED APPLICATION

Reference is made to commonly assigned, co-pending application Ser. No. 09/867,876, entitled CAMERA WITH SELF-TIMER FOR DELAYED ACTION SHUTTER RELEASE, and filed May 30, 2001 in the names of Cristobal Casillas and Gilberto F. Rodriguez.

FIELD OF THE INVENTION

The invention relates generally to photography, and more particularly to a camera with a self-timer that is otherwise referred to as a delayed action shutter release or delayed action device.

BACKGROUND OF THE INVENTION

Film and cameras that are all in one, commonly referred to as disposable single-use or one-time-use cameras, have become well known. The one-time-use camera is a simple point-and-shoot type camera comprising a conventional film cartridge within a cartridge receiving chamber in a main body part, an unexposed film roll prewound from the film cartridge onto a film supply spool within a film supply chamber in the main body part, a film-exposing backframe opening between the cartridge receiving and film supply chambers in the main body part, a fixed-focus taking lens, a film metering mechanism with a rotatably supported metering sprocket that has respective sprocket teeth for engaging the filmstrip at successive film perforations, a manually rotatable film winding thumbwheel coaxially engaged with a film winding spool inside the film cartridge, a single-blade shutter, a manually depressible shutter release button, an exposure counter wheel that has a numerical series of evenly spaced exposure count indicia and is incrementally rotated to successively view the exposure count indicia, an anti-backup pawl that engages the exposure counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After a picture is taken with the one-time-use camera by manually depressing the shutter release button, the photographer manually rotates the thumbwheel in a film winding direction to similarly rotate the film winding spool inside the film cartridge. This winds an exposed frame of the filmstrip from the backframe opening into the film cartridge and advances an unexposed frame of the filmstrip from the unexposed film roll to the backframe opening. The rewinding movement of the filmstrip the equivalent of slightly more than one frame width rotates the metering sprocket in engagement with the filmstrip to decrement the exposure counter wheel to its next lower-numbered indicia and to pivot a metering lever into engagement with the thumbwheel in order to prevent further manual rotation of the thumbwheel in the film winding direction. Manually depressing the shutter release button to take another picture pivots the metering lever out of engagement with the thumbwheel to permit renewed rotation of the thumbwheel in the film winding direction. When the maximum number of exposures available on the filmstrip have been made and the filmstrip is completely wound into the film cartridge, the one-time-use camera is given to a photofinisher who breaks away a cover door portion of the rear cover part from the main body part and removes the film cartridge with the exposed filmstrip from the cartridge receiving chamber. Then, he removes the exposed filmstrip from the film cartridge to develop the latent images and make prints for the customer.

Typically, one-time-use cameras do not include a self-timer, i.e. a delayed action shutter release, which is manually actuated to automatically initiate picture-taking after a predetermined interval of time has elapsed following the actuation. The predetermined interval of time allows one to become a part of the scene to be photographed after he or she has manually actuated the self-timer.

Prior art U.S. Pat. No. 5,946,514 issued Aug. 31, 1999 discloses a one-time-use camera with a self-timer. The self-timer is built into the camera and includes a number of gears and an escapement, and therefore significantly increases the cost of the camera and is relatively complex.

THE CROSS-REFERENCED APPLICATION

The cross-referenced application discloses a camera that has a shutter release button which is depressible to initiate picture-taking, and a self-timer for automatically initiating picture-taking after a predetermined interval of time has elapsed. The self-timer is a flexible resilient diaphragm or thin disk to be manually deformable from a normal state to a deformed state and to have the capability of automatically returning to the normal state from the deformed state after the predetermined interval of time has elapsed. A support in the vicinity of the shutter release button is constructed to receive the self-timer in the deformed state in order to position the self-timer raised from the shutter release button, but to permit the self-timer to automatically return to the normal state after the predetermined interval of time has elapsed in order to depress the shutter release button to initiate picture taking. The self-timer can be removed from the support in order to use the shutter release button without the self-timer or to reuse the self-timer.

SUMMARY OF THE INVENTION

A camera comprising a shutter release button that is manually depressible to initiate picture-taking, and a self-timer for automatically initiating picture-taking after a predetermined interval of time has elapsed, is characterized in that:

a restrainer is movable to prevent picture-taking from being initiated due to the shutter release button being manually depressed and is retractable following the shutter release button being manually depressed to permit picture-taking to proceed; and the self-timer is a flexible resilient diaphragm that can be manually deformed from a relaxed state to a tensioned state to move the restrainer to prevent picture-taking from being initiated and that will automatically recover to the relaxed state from the tensioned state after the predetermined interval of time has elapsed to allow the restrainer to permit picture-taking to proceed.

DETAILED DESCRIPTION OF THE INVENTION

The invention is disclosed as being embodied preferably in a disposable one-time-use camera. Because the features of a one-time-use camera unit are generally known, the description which follows is directed in particular only to those elements forming part of or cooperating directly with the disclosed embodiment. It is to be understood, however, that other elements may take various forms known to a person of ordinary skill in the art.

Figure 1:
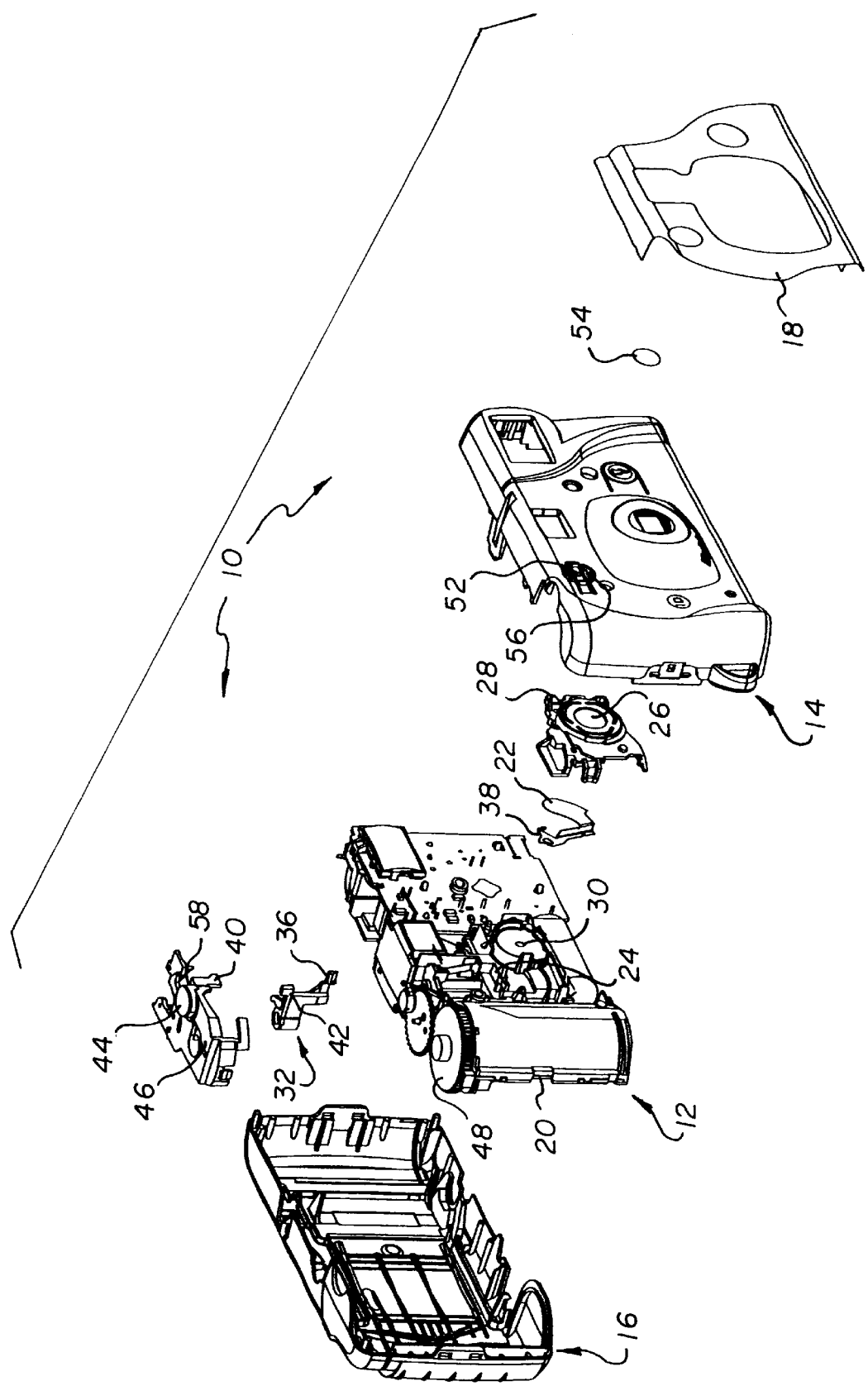
FIG. 1 is an exploded front perspective view of a one-time-use camera with a self-timer according to a preferred embodiment of the invention.
Figure 2:
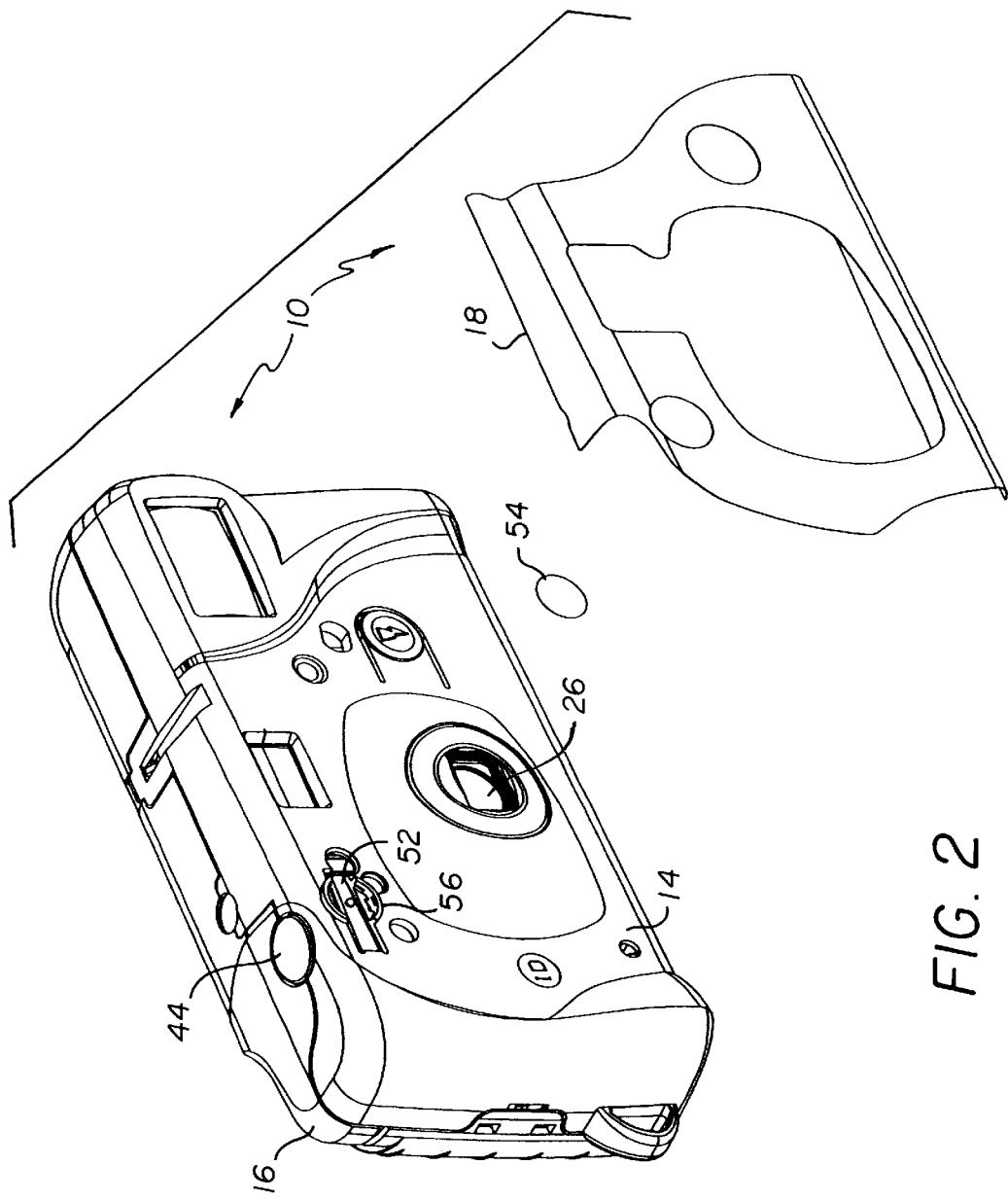
FIG. 2 is a substantially-assembled front perspective view of the camera.

Referring now to the drawings, FIGS. 1 and 2 depict a disposable one-time-use camera 10 including a plastic opaque interior main body part 12, a plastic opaque exterior front cover part 14, and a plastic opaque exterior rear cover part 16. The front cover part 14 and the rear cover part 16 house the main body part 12 between them and are connected releasably to one another and to the main body part via known hook-in-hole connections. A front label 18 is attached to the front cover part.

As is typical, the main body part 12 has a rearwardly open cartridge receiving chamber 20 for a conventional film cartridge (not shown) and a rearwardly open film supply chamber (not shown) for an unexposed film roll on a rotatable film supply spool. During assembly of the camera 10, an unexposed filmstrip (not shown) is substantially prewound from a rotatable film winding spool inside a shell of the film cartridge and into the unexposed film roll on the film supply spool.

Figure 3:
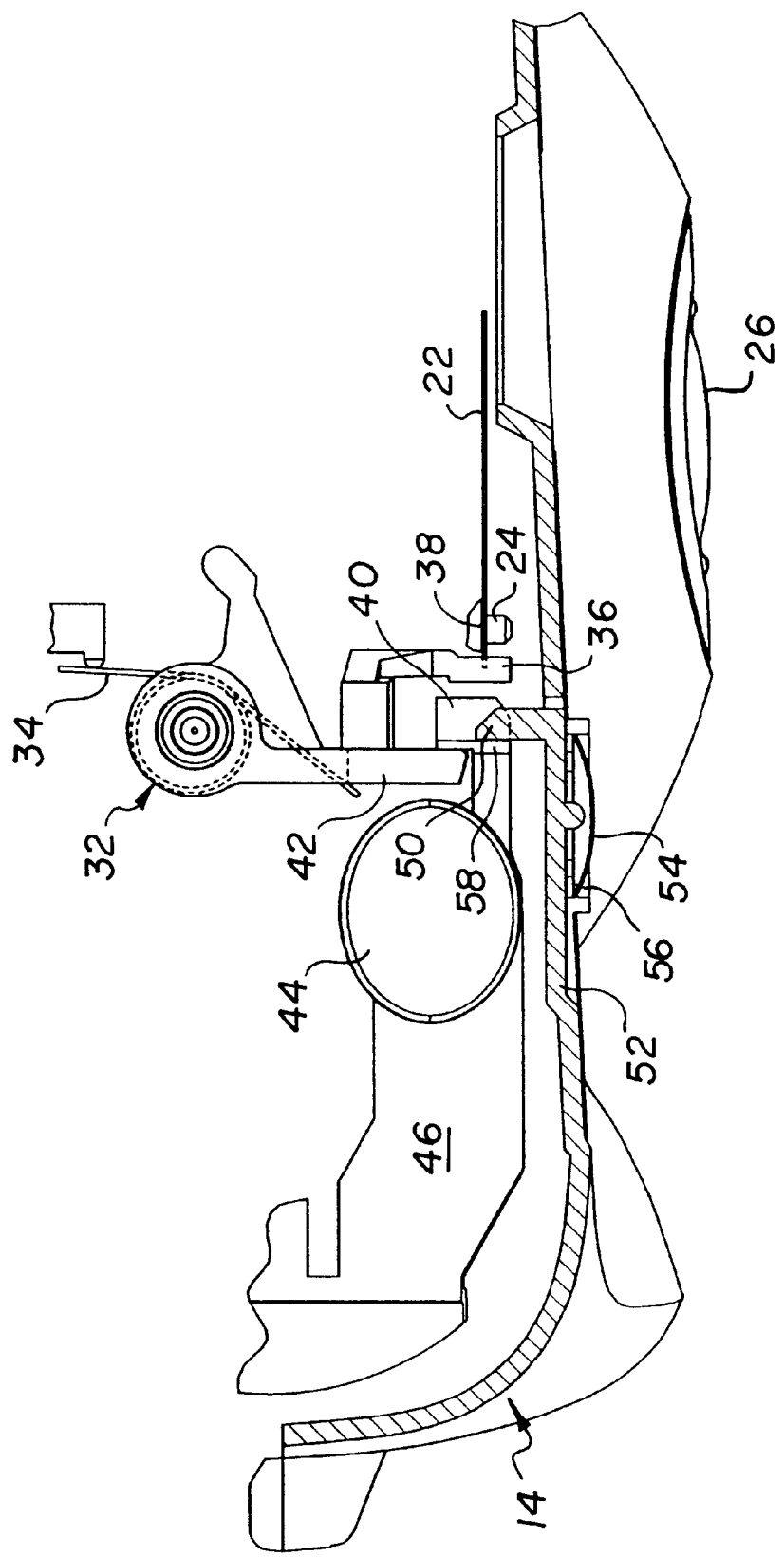
FIGS. 3 and 4 are top plan views within the camera depicting picture-taking without using the self-timer.
Figure 4:
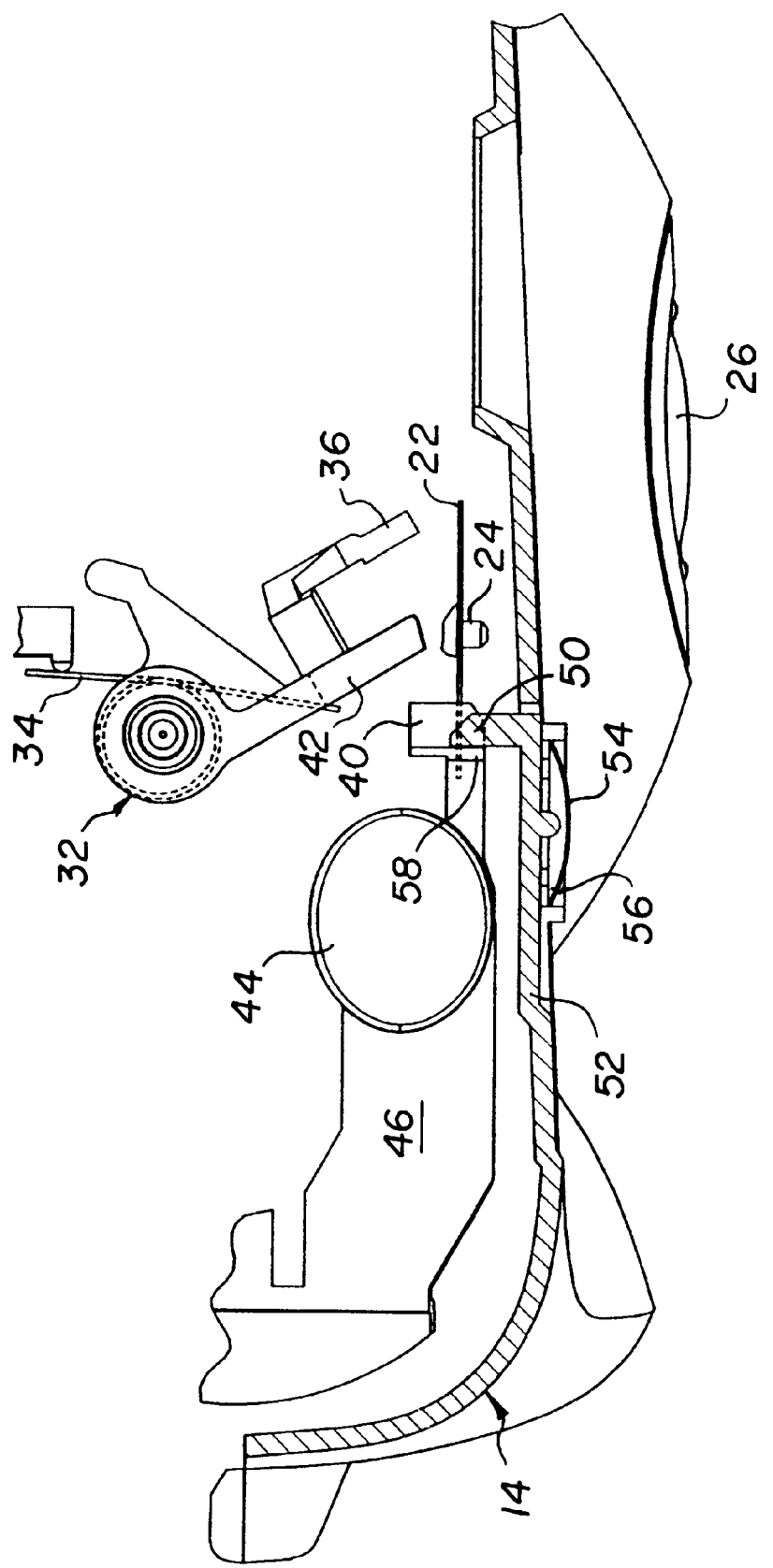

As shown in FIGS. 1–3, a shutter blade 22 is pivotally mounted on a fixed post 24 on the main body part 12, between a front taking lens 26 on a lens plate 28 and an exposure aperture 30 in the main body part, to pivot open in order to expose a film frame behind the exposure aperture. A return spring (not shown) pivots the shutter blade 22 re-closed. A high energy lever 32 is pivotable (counter-clockwise in FIGS. 3–4) via a torsion spring 34 to swing a striker 36 of the high energy lever against a tang 38 of the shutter blade 22 to pivot the shutter blade open. A latch 40 normally engages a projection 42 of the high energy lever 32 to prevent the high energy lever from being pivoted for the striker 36 to impact the tang 38 of the shutter blade 22. The latch 40 is integrally connected with a shutter release button 44 that is on a free end of a flexible resilient cantilevered beam 46. The beam 46 allows the shutter release button 44 to be manually depressed, which lowers the latch 40 from the projection 42 as shown in FIG. 4 to release the high energy lever 32. This allows the high energy lever 32 to be pivoted for the striker 36 to impact the tang 38 of the shutter blade 22.

A rotatable film winding thumbwheel 48 coaxially engages the film winding spool inside the shell of the film cartridge and radially protrudes from an elongate narrow opening in the rear cover part 16 in order to be manually grasped or fingered at its periphery to incrementally rotate the thumbwheel in a film winding direction to similarly rotate the film winding spool. This is done in order to wind an exposed frame of the filmstrip into the film cartridge after each film exposure, and to move a fresh frame of the filmstrip from the unexposed film roll to behind the exposure aperture 30.

Figure 5:
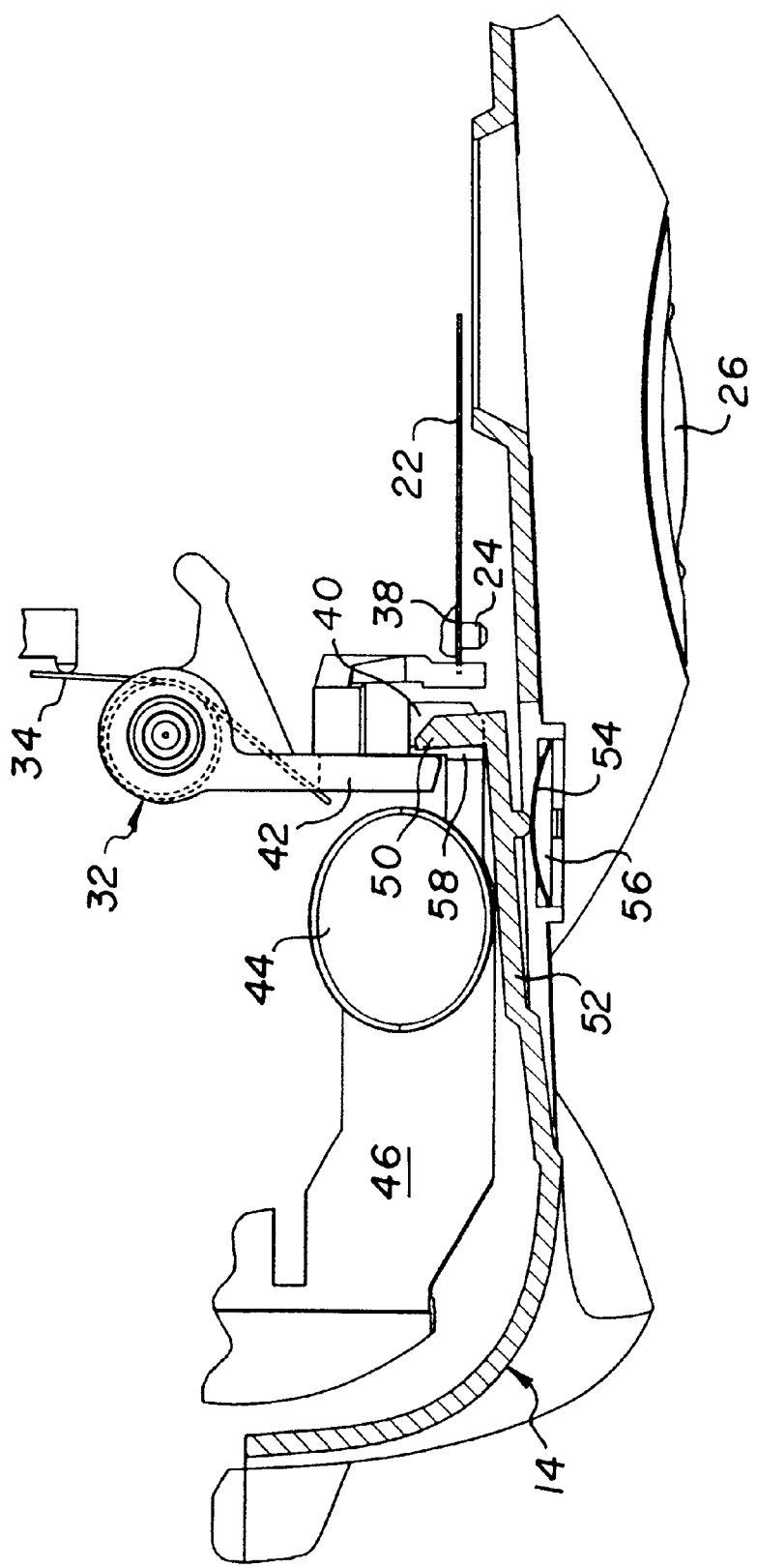
FIGS. 5, 6 and 7 are top plan views within the camera depicting picture-taking using the self-timer.
Figure 7:
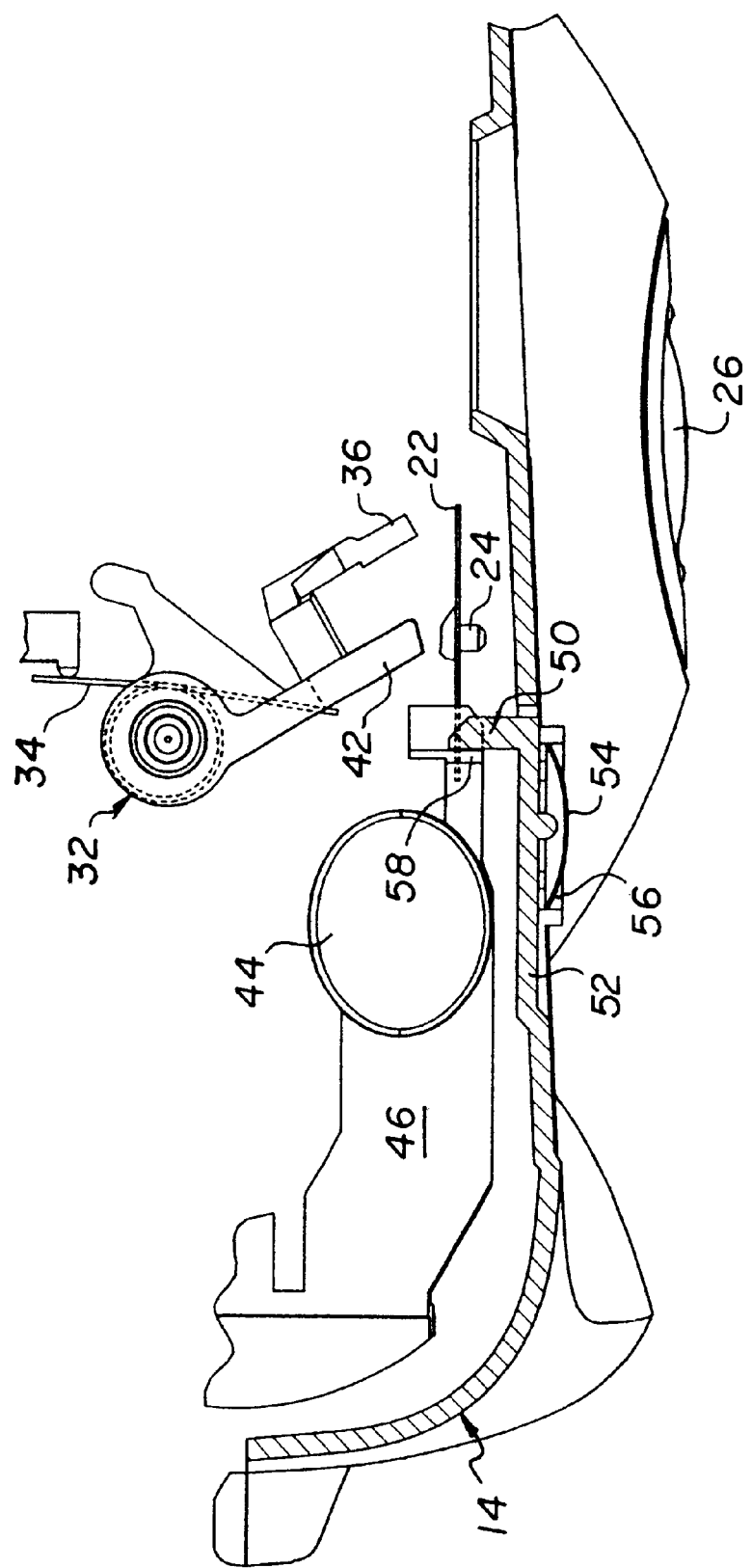

A restrainer 50 is on a free end of a flexible resilient cantilevered beam 52 that is integrally connected with the front cover part 14. See FIGS. 2 and 3. The beam 52 allows the restrainer 50 to be moved inwardly of the front cover part 14 as shown in FIG. 5 to block the projection 42 to prevent the high energy lever 32 from being pivoted for the striker 36 to impact the tang 38 of the shutter blade 22. When the restrainer 50 is retracted from the projection 42 as shown in FIG. 7 the high energy lever 32 is pivoted for the striker 36 to impact the tang 38 of the shutter blade 22. Whereupon, the shutter blade 22 is pivoted open.

Figure 6:
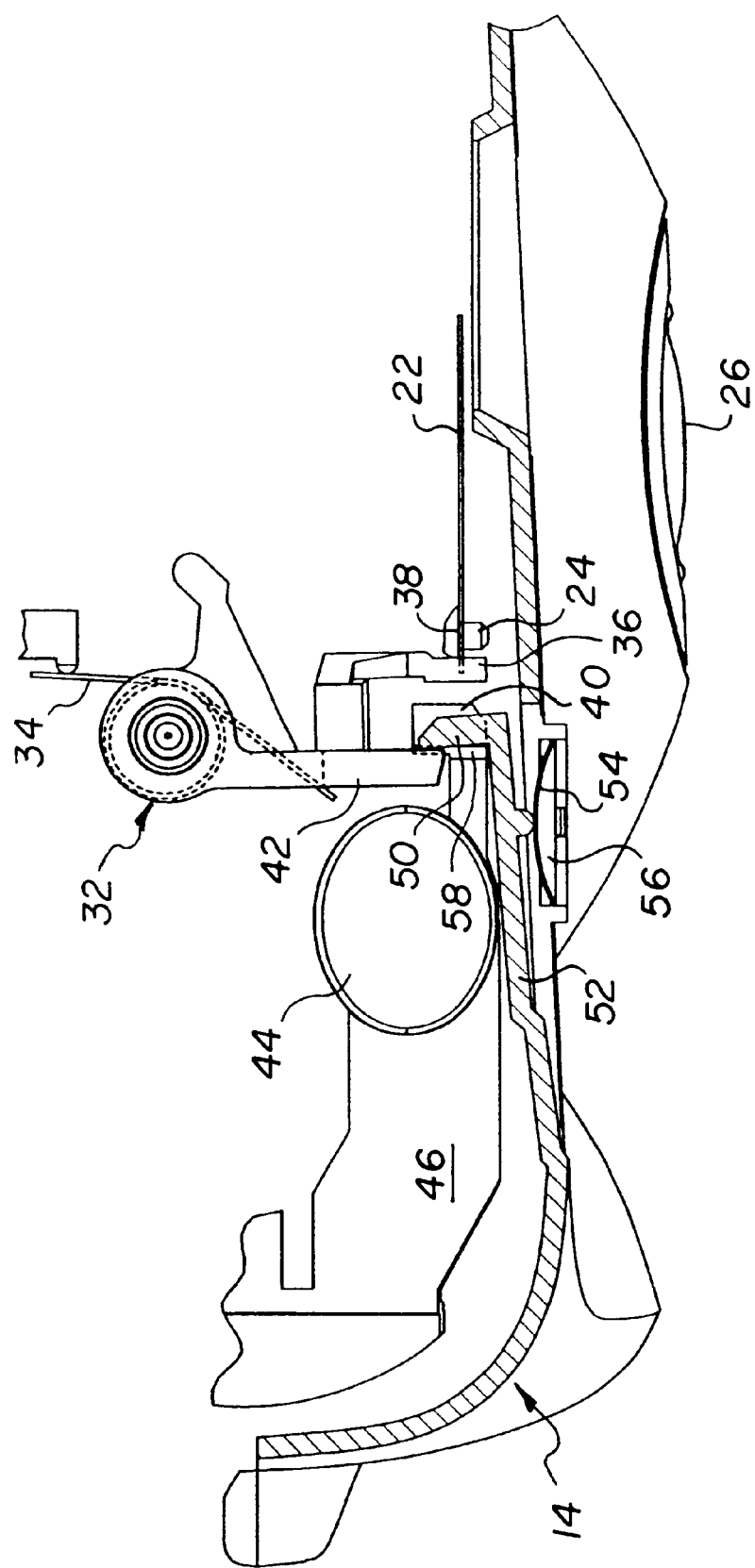

A self-timer that is otherwise referred to as a delayed action shutter release or delayed action device is a flexible resilient diaphragm or thin metal disk 54 and as shown in FIGS. 3, 4 and 7 is normally shaped like a shallow bowl or dish. FIGS. 3, 4 and 7 show the diaphragm 54 in a normal or relaxed convex (bulging) state within a nest 56 in the front cover part 14. However, as shown in FIGS. 5 and 6 the diaphragm 54 can be manually deformed to a tensioned concave (collapsed) state in which the diaphragm is inverted. In this instance, the diaphragm 54 will automatically snap back to its normal relaxed concave state shown in FIG. 7 after a brief time delay, i.e. an interval of 20 seconds for example.

To use the self-timer, i.e. the diaphragm 54, the diaphragm is manually depressed into the nest 56 to change from its normal or relaxed convex state to its tensioned concave state, to move the restrainer 50 inwardly of the front cover part 14 as shown in FIG. 5 to block the projection 42 of the high energy lever 32. This prevents the high energy lever 32 from being pivoted for the striker 36 to impact the tang 38 of the shutter blade 22. Then, the shutter release button 44 is manually depressed to lower the latch 40 from the projection 42 as shown in FIG. 6, to release the high energy lever 32. This allows the high energy lever 32 to be pivoted ever so slightly since the projection 42 moves against the restrainer 50. At the same time, an extension 58 of the shutter release button 44 is captured beneath the projection 42 to prevent the shutter release button from being raised. After a brief time delay, i.e. an interval of 20 seconds for example, the diaphragm 54 automatically snaps back to its normal relaxed concave state as shown in FIG. 7, which allows the restrainer 50 to retract from the projection 42. Then, the high energy lever 42 is pivoted for the striker 36 to impact the tang 38 of the shutter blade 22. Whereupon, the shutter blade 22 is pivoted open.

The invention has been described in detail with particular reference to certain preferred embodiments thereof, but it will be understood that variations and modifications can be effected within the spirit and scope of the invention.

PARTS LIST 10. one-time-use camera
12. main body part
14. front cover part
16. rear cover part
18. front label
20. cartridge receiving chamber
22. shutter blade
24. fixed post
26. front taking lens
28. lens plate
30. exposure aperture
32. high energy lever
34. torsion spring
36. striker 38. tang
40. latch
42. projection
44. shutter release button
46. cantilevered beam
48. film winding thumbwheel
50. restrainer
52. cantilevered beam
54. diaphragm
56. nest
58. extension

What is claimed is:

1. A camera comprising a shutter release button that is manually depressible to initiate picture-taking, and a self-timer for automatically initiating picture-taking after a predetermined interval of time has elapsed, is characterized in that:

a restrainer is movable to prevent picture-taking from being initiated due to said shutter release button being manually depressed and is retractable following said shutter release button being manually depressed to permit picture-taking to proceed; and said self-timer is a flexible resilient diaphragm that can be manually deformed from a relaxed state to a tensioned state to move said restrainer to prevent picture-taking from being initiated and that will automatically recover to the relaxed state from the tensioned state after the predetermined interval of time has elapsed to allow said restrainer to permit picture-taking to proceed.

2. A camera as recited in claim 1, wherein said diaphragm when deformed to the tensioned state forcibly maintains said restrainer moved to prevent picture-taking from being initiated and when recovered to the relaxed state releases said restrainer to allow said restrainer to retract to permit picture-taking to proceed.

3. A camera as recited in claim 1, wherein a front cover part supports said restrainer for movement to prevent picture-taking from being initiated due to said shutter release button being manually depressed and for retraction following said shutter release button being manually depressed to permit picture-taking to proceed.

4. A camera comprising a shutter release button that is manually depressible to initiate picture-taking, and a self-timer for automatically initiating picture-taking after a predetermined interval of time has elapsed, is characterized in that:

a restrainer is movable to prevent picture-taking from being initiated due to said shutter release button being manually depressed and is retractable following said shutter release button being manually depressed to permit picture-taking to proceed;

said self-timer is a flexible resilient diaphragm that can be manually deformed from a relaxed state to a tensioned state to move said restrainer to prevent picture-taking from being initiated and that will automatically recover to the relaxed state from the tensioned state after the predetermined interval of time has elapsed to allow said restrainer to permit picture-taking to proceed; and a front cover part has an integral cantilevered beam that constitutes said restrainer and has a nest that supports said diaphragm opposite said cantilevered beam.

5. A camera as recited in claim 4, wherein said diaphragm is flexed inwardly within said nest toward said cantilevered beam to be concave in the tensioned state and recovers outwardly within said nest away from said cantilevered beam to be convex in the relaxed state.

6. A camera as recited in claim 1, wherein a high energy lever is pivotable to strike a shutter blade to initiate picture-taking, a latch engages said high energy lever to prevent said high energy lever from being pivoted to strike said shutter blade and is connected with said shutter release button to separate from said high energy lever when said shutter release button is manually depressed, and said restrainer first prevents said high energy lever from being pivoted to strike said shutter blade when said restrainer has been moved to prevent picture-taking from being initiated and said shutter release button is manually depressed to separate said latch from said high energy lever and then allows said high energy lever to strike said shutter blade when said restrainer is retracted.

7. A camera as recited in claim 6, wherein said diaphragm when deformed to the tensioned state forcibly holds said restrainer moved to prevent said high energy lever from being pivoted to strike said shutter blade and when recovered to the relaxed state separates from said restrainer to allow said restrainer to retract.

8. A camera comprising a shutter release button that is manually depressible to initiate picture-taking, and a self-timer for automatically initiating picture-taking after a predetermined interval of time has elapsed, is characterized in that:

picture-taking prevention means is movable to prevent picture-taking from being initiated due to said shutter release button being manually depressed and is movable following said shutter release button being manually depressed to permit picture-taking to proceed; and said self-timer is delayed action means that can be manually deformed to move said picture-taking prevention means to prevent picture-taking from being initiated and that will automatically recover after the predetermined interval of time has elapsed to allow said picture-taking prevention means to move to permit picture-taking to proceed.

9. A camera comprising:

a high energy lever that is pivotable to strike a shutter blade to initiate picture-taking;

a latch that engages said high energy lever to prevent said high energy lever from being pivoted to strike said shutter blade and that is connected with a manually depressible shutter release button to separate from said high energy lever when said shutter release button is manually depressed;

a restrainer that is movable to prevent said high energy lever from being pivoted to strike said shutter blade when said shutter release button is manually depressed to separate said latch from said high energy lever and that can retract from said high energy lever to allow said high energy lever to strike said shutter blade; and a flexible resilient diaphragm that can be manually deformed from a relaxed state to a tensioned state to move said restrainer to prevent said high energy lever from being pivoted to strike said shutter blade and that will automatically recover to the relaxed state from the tensioned state after a predetermined interval of time has elapsed to permit said restrainer to retract to allow said high energy lever to strike said shutter blade.

* * * * *